(12) United States Patent
Feiste et al.

(10) Patent No.: US 10,936,321 B2
(45) Date of Patent: Mar. 2, 2021

(54) INSTRUCTION CHAINING

(71) Applicant: International Business Machines Corporation, Armonk, NY (US)

(72) Inventors: Kurt A. Feiste, Austin, TX (US); Joshua W. Bowman, Austin, TX (US); Christopher M. Mueller, Round Rock, TX (US); Dung Q. Nguyen, Austin, TX (US); Deepak K. Singh, Apex, NC (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/264,795

(22) Filed: Feb. 1, 2019

(65) Prior Publication Data

US 2020/0249954 A1 Aug. 6, 2020

(51) Int. Cl.
*G06F 9/38* (2018.01)
*G06F 9/30* (2018.01)

(52) U.S. Cl.
CPC ........ *G06F 9/3853* (2013.01); *G06F 9/30145* (2013.01); *G06F 9/3838* (2013.01)

(58) Field of Classification Search
None
See application file for complete search history.

(56) References Cited

U.S. PATENT DOCUMENTS

| | | | | |
|---|---|---|---|---|
| 5,509,130 A | * | 4/1996 | Trauben | G06F 9/3804 712/215 |
| 6,112,019 A | * | 8/2000 | Chamdani | G06F 9/3836 712/214 |
| 6,212,621 B1 | * | 4/2001 | Mahalingaiah | G06F 9/30152 712/200 |

(Continued)

OTHER PUBLICATIONS

Mutlu, O., Computer Architecture Lecture 10: Out-of-Order Execution, Carnegie Mellon University, Oct. 3, 2011.

(Continued)

*Primary Examiner* — Steven G Snyder
(74) *Attorney, Agent, or Firm* — Scully, Scott, Murphy & Presser, P.C.

(57) ABSTRACT

An approach is disclosed that that in one or more embodiments includes receiving an indicator to issue an out-of-order instruction or a type of out-of-order instruction in-order; receiving a first instruction; determining whether the first instruction corresponds to the indicated out-of-order instruction or the type of out-of-order instruction; writing, in response to determining that the first instruction corresponds to the indicated out-of-order instruction or the type of out-of-order instruction, an instruction identifier and a dependent instruction opcode into a first queue and an issue queue of the processor; receiving at least one subsequent instruction; determining whether an instruction opcode of the subsequent instructions matches the dependent instruction opcode of the first instruction; and writing, in response to determining the instruction opcode of the subsequent (Continued)

instruction matches the dependent instruction opcode of the instruction, a dependent instruction identifier for the subsequent instruction into the issue queue.

20 Claims, 4 Drawing Sheets

(56) References Cited

U.S. PATENT DOCUMENTS

| | | | | |
|---|---|---|---|---|
| 6,542,988 | B1* | 4/2003 | Tremblay | G06F 9/3824 |
| | | | | 712/218 |
| 6,629,233 | B1* | 9/2003 | Kahle | G06F 9/3013 |
| | | | | 712/217 |
| 7,363,467 | B2* | 4/2008 | Vajapeyam | G06F 9/3808 |
| | | | | 712/214 |
| 8,037,366 | B2* | 10/2011 | Abernathy | G06F 9/3838 |
| | | | | 712/219 |
| 8,095,779 | B2* | 1/2012 | Luick | G06F 9/30043 |
| | | | | 712/214 |
| 8,301,870 | B2 | 10/2012 | Kailas | |
| 9,354,884 | B2* | 5/2016 | Comparan | G06F 9/30145 |
| 9,405,545 | B2 | 8/2016 | Shwartsman et al. | |
| 9,535,696 | B1 | 1/2017 | Gschwind et al. | |
| 9,798,549 | B1* | 10/2017 | Boersma | G06F 11/30 |
| 10,007,521 | B1* | 6/2018 | Tam | G06F 9/384 |
| 10,114,652 | B2* | 10/2018 | Comparan | G06F 9/3838 |
| 10,191,748 | B2* | 1/2019 | Mathew | G06F 9/3836 |
| 10,564,976 | B2* | 2/2020 | Silberman | G06F 9/3838 |
| 2004/0148493 | A1* | 7/2004 | Chu | G06F 9/3836 |
| | | | | 712/214 |
| 2009/0210668 | A1* | 8/2009 | Luick | G06F 9/30043 |
| | | | | 712/216 |
| 2009/0259827 | A1* | 10/2009 | Ramirez | G06F 9/3838 |
| | | | | 712/216 |
| 2010/0250900 | A1* | 9/2010 | Brown | G06F 9/3814 |
| | | | | 712/208 |
| 2010/0251016 | A1* | 9/2010 | Abernathy | G06F 9/3838 |
| | | | | 714/15 |
| 2012/0089819 | A1* | 4/2012 | Chaudhry | G06F 9/3838 |
| | | | | 712/214 |
| 2014/0380024 | A1* | 12/2014 | Spadini | G06F 9/3836 |
| | | | | 712/217 |
| 2016/0011877 | A1* | 1/2016 | Mukherjee | G06F 9/3855 |
| | | | | 712/208 |
| 2016/0224351 | A1 | 8/2016 | Comparan et al. | |
| 2018/0081686 | A1* | 3/2018 | Ho | G06F 9/3834 |
| 2019/0034208 | A1* | 1/2019 | Comparan | G06F 9/3838 |
| 2019/0163482 | A1* | 5/2019 | Silberman | G06F 9/3851 |
| 2019/0163483 | A1* | 5/2019 | Silberman | G06F 9/3838 |
| 2019/0163484 | A1* | 5/2019 | Silberman | G06F 9/3851 |
| 2019/0163485 | A1* | 5/2019 | Karve | G06F 9/3891 |
| 2019/0163486 | A1* | 5/2019 | Sinharoy | G06F 9/3838 |
| 2019/0163488 | A1* | 5/2019 | Karve | G06F 9/3855 |
| 2019/0163489 | A1* | 5/2019 | Karve | G06F 9/3836 |
| 2019/0377599 | A1* | 12/2019 | Abhishek Raja | G06F 9/3857 |

OTHER PUBLICATIONS

Disclosed Anonymously, System and Method for Achieving Out-of-Order Execution of Instructions in Simultaneously-Multithreaded (SMT) Processor Cores, Sep. 20, 2010.
Disclosed Anonymously, Trace-Core Processors, Sep. 20, 2010.
Disclosed Anonymously, Meta-Core Processors, Sep. 17, 2010.

* cited by examiner

INSTRUCTION CHAINING

BACKGROUND

The disclosure herein relates generally to processors, and more particularly, to methods, apparatus, and products for artificially creating dependencies between instructions to process in-order.

Many processors operate using an out-of-order execution approach to execute program instructions. Typically, executing program instruction in an out-of-order fashion requires a processor to predict which branch to execute the instruction and compute ahead when the input data and an execution unit becomes available. If the processor chooses the incorrect branch, the processor flushes the results of the computed instruction and the official architected state is rolled back to execute the instruction on another branch.

Rolling back the architected state of the processor to execute an instruction on another branch may create non-architectural side effects, such as security vulnerabilities. For example, by rolling back the architected state of the processor each time an instruction is executed at the incorrect branch, malicious code can probe different areas of a processor's memory of registers to determine what effects the malicious code causes in an area of the memory, for example the cache. For instance, the malicious code can probe different branches in the memory to determine whether the instruction was loaded in a cache line based on the length of time the instruction takes to access the memory. That is, the malicious code may utilize the fast instruction streams of the out-of-order execution approach to the detriment of the processor.

Currently, a processor may only track true dependencies between instructions, for example, when one instruction creates data that needs to be used by another instruction. However, there is a need to artificially create dependencies between instructions to process the instructions in-order to slow down instruction streams to work around problems.

SUMMARY

The summary of the disclosure is given to aid understanding of a computer system, computer architectural structure, processor, and method of artificially creating dependencies between instructions to operate in an in-order execution fashion, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

In one or more embodiments, a method of processing information in a processor of a computer system includes receiving an indicator to issue an out-of-order instruction or a type of out-of-order instruction in-order. In one or more embodiments, the method includes receiving a first instruction. In one or more embodiments, the method includes determining whether the first instruction corresponds to the indicated out-of-order instruction or the type of out-of-order instruction. In one or more embodiments, the method includes writing, in response to determining that the first instruction corresponds to the indicated out-of-order instruction or the type of out-of-order instruction, an instruction identifier and a dependent instruction opcode into a first queue and an issue queue of the processor. In one or more embodiments, the method includes receiving at least one subsequent instruction. In one or more embodiments, the method includes determining whether an instruction opcode of the at least one subsequent instruction matches the dependent instruction opcode of the first instruction. In one or more embodiments, the method includes writing, in response to determining the instruction opcode of the subsequent instruction matches the dependent instruction opcode of the instruction, a dependent instruction identifier for the subsequent instruction into the issue queue.

In one or more embodiments, a computer program product includes a non-transitory computer-readable storage medium having program instructions embodied therewith, in which the program instructions are executable by one or more processors. The program instructions, in an embodiment, include receiving an indicator to issue an out-of-order instruction or a type of out-of-order instruction in-order. The program instructions, in an embodiment, include receiving a first instruction. The program instructions, in an embodiment, include determining whether the first instruction corresponds to the indicated out-of-order instruction or the type of out-of-order instruction. The program instructions, in an embodiment, include writing, in response to determining that the first instruction corresponds to the indicated out-of-order instruction or the type of out-of-order instruction, an instruction identifier and a dependent instruction opcode into a first queue and an issue queue of the processor. The program instructions, in an embodiment, include receiving at least one subsequent instruction. The program instructions, in an embodiment, include determining whether an instruction opcode of the at least one subsequent instruction matches the dependent instruction opcode of the first instruction. The program instructions, in an embodiment, include writing, in response to determining the instruction opcode of the subsequent instruction matches the dependent instruction opcode of the instruction, a dependent instruction identifier for the subsequent instruction into the issue queue.

In one or more embodiments, an information handling system includes memory having program instructions embodied therewith, and at least one processor. In an embodiment the at least one processor is configured to read the program instructions to execute a dispatch unit configured to receive an indicator to issue an out-of-order instruction or a type of out-of-order instruction in-order. In an embodiment the at least one processor is configured to read the program instructions to execute a first queue configured to: receive a first instruction, determine whether the first instruction corresponds to the indicated out-of-order instruction or the type of out-of-order instruction, write, in response to determining that the first instruction corresponds to the indicated out-of-order instruction or the type of out-of-order instruction, an instruction identifier and a dependent instruction opcode into the first queue and an issue queue of the processor, receive at least one subsequent instruction, and determine whether an instruction opcode of the at least one subsequent instructions matches the dependent instruction opcode of the first instruction. In an embodiment, the at least one processor is configured to read the program instructions to execute the issue queue configured to write, in response to determining the instruction opcode of the subsequent instruction matches the dependent instruction opcode of the instruction, a dependent instruction identifier for the subsequent instruction into the issue queue.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, systems, embodiments, or devices shown, and the arrangements, structures, subassemblies, features, aspects, methods, processes, embodiments, and devices shown may be used singularly or in combination with other arrangements, structures, assemblies, subassemblies, systems, features, aspects, methods, processes, embodiments, and devices.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, and their method of operation, however, it will be understood by those skilled in the art that different and numerous embodiments of the computer system, computer architectural structure, processor, and their method of operation may be practiced without those specific details, and the claims and disclosure should not be limited to the embodiments, subassemblies, features, processes, methods, aspects, features, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information handling systems, including processors and microprocessor systems and architectures, which are apparent to those skilled in the art. It is assumed that those skilled in the art are familiar with the general architecture of processors, and in particular with processors which operate in an out-of-order execution fashion. It may be noted that a numbered element is numbered according to the figure in which the element is introduced, and is typically referred to by that number throughout succeeding figures.

Exemplary methods, apparatus, and products for artificially creating dependencies between instructions to process in-order in a processor configured to process one or more instructions out-of-order in accordance with the present disclosure are described further below with reference to the Figures. In one or more embodiments, the exemplary methods, apparatus, and products artificially create dependencies between instructions, which may typically process out-of-order, to force instructions to process in-order relative to each other.

Figure 1:
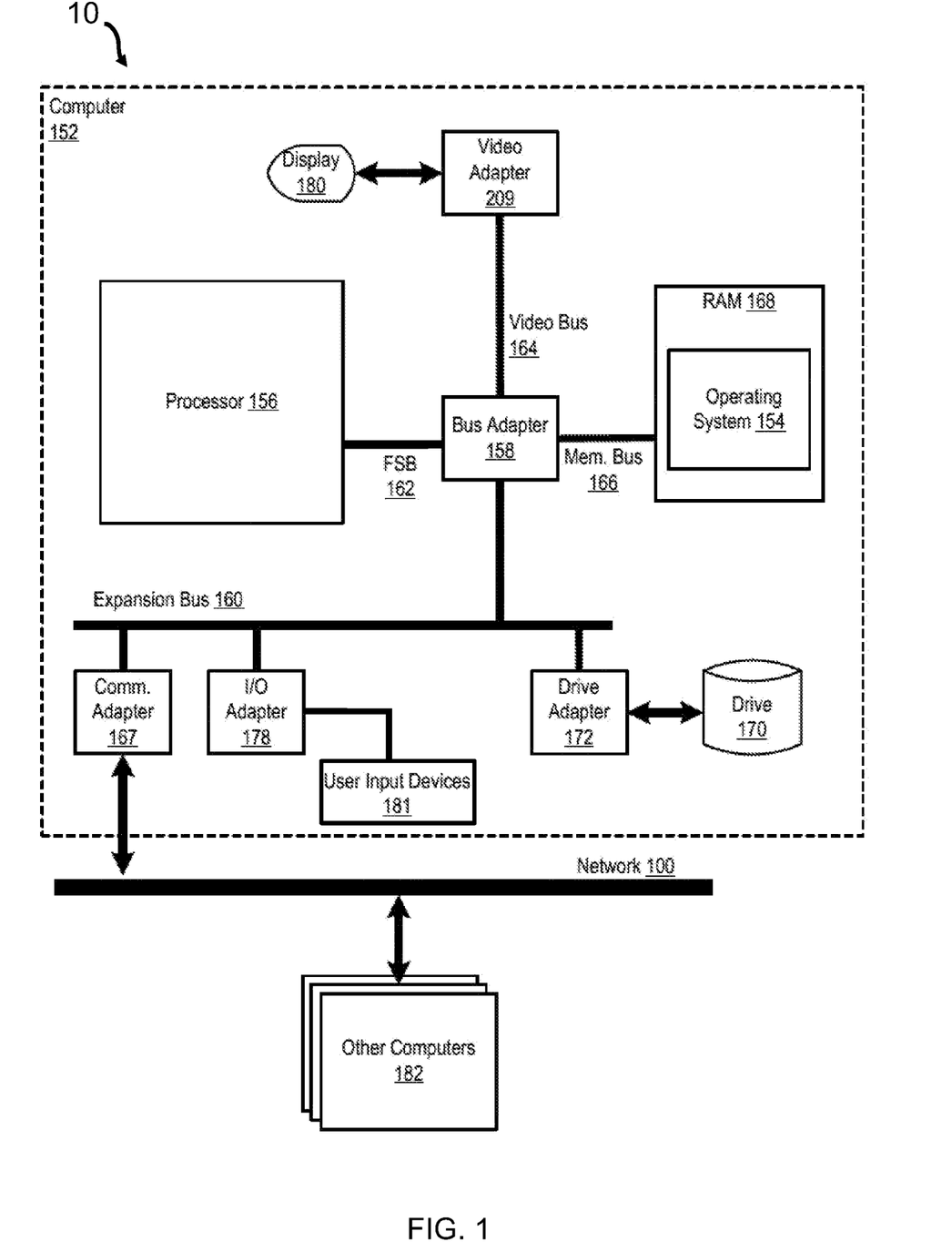
FIG. 1 is a functional block diagram illustrating an information handling system (IHS), according to one or more embodiments of the present disclosure.

FIG. 1 is a functional block diagram illustrating an IHS 10, according to one or more embodiments of the present disclosure. The IHS 10 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152. In some embodiments, the processor 156 includes various components, such as, registers, queues, buffers, memories, and other units formed by integrated circuitry. The processor 156 may operate according to reduced instruction set computing ("RISC") techniques. The processor 156 may process according to processor cycles, synchronized, in some aspects, to an internal clock. In some embodiments, RAM 168 is an embedded dynamic random access memory (eDRAM). In some embodiments, RAM 168 is utilized by the components of the processor 156, via communication fabric 204. In one or more embodiments, RAM 168 is configured to store one or more in-order execution indicators and/or program instructions to be executed by the processor 156. In one or more other embodiments, one or more memory locations of computer 152 are connected to computer 152 and are configured to store the one or more in-order execution indicators and/or program instructions to be executed by the processor 156.

Although the processor 156 is shown to be coupled to RAM 168 through the front side bus 162, the bus adapter 158, and the high speed memory bus 166, those of ordinary skill in the art will recognize that such configuration is only an illustrative implementation and other configurations of coupling the processor 156 to other components of the system 10 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™ Linux™, Microsoft Windows™, AIX™, IBM's z/OS™, and others known to those of ordinary skill in the art. In addition to the operating system 154 and the data processing application 102 being located in RAM 168, other components of such software may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 100. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

In one or more embodiments, the IHS system 10 may simultaneously perform more than one instruction, and/or perform more than one instruction within the same time frame. For example, the processor 156 of the IHS 10 may include more than one processor core and each processor core may be capable of acting independently of other processor cores. The IHS 10 may multitask by having each processor core process a different instruction stream in parallel with the other processor cores of the computer 152. Multiple hardware threads may be included within each processor core, with the threads sharing certain resources of the processor core. This may allow each processor core to take advantage of thread-level parallelism. To handle the multiple threads in each processor core, a processor core may have multiple execution slices. An execution slice may refer to a set of data processing circuitry or hardware units connected in series within a processor core or a processor having a plurality of similar or identical sets of components, in which each set of components may operate independently of all the other sets or in concert with the one or more of the other sets. An execution slice may be a pipeline or pipeline-like structure. Multiple execution slices may be used as part of simultaneous multi-threading (SMT) within a processor core.

Figure 2:
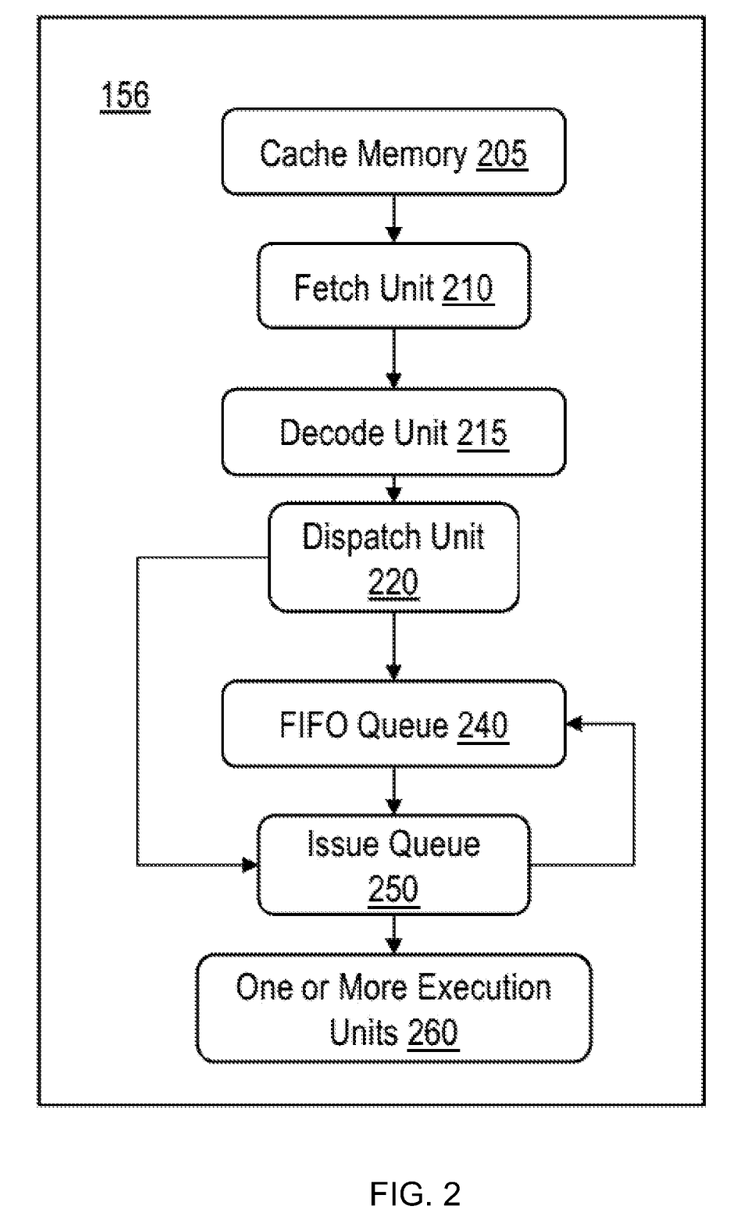
FIG. 2 is a functional block diagram illustrating a processor of the information handling system, according to one or more embodiments of the present disclosure.

FIG. 2 is a functional block diagram illustrating the processor 156 of the IHS 10 configured to operate memory, one or more units, and one or more queues, according to one or more embodiments of the present disclosure. One or more embodiments of the IHS 10 employs at least one processor 156 that includes one or more queues, such as a first in, first out (FIFO) queue 240 and the Issue queue 250, for holding instructions, and/or data, operands, and information. The one or more queues may hold one instruction or multiple instructions at a time. In some embodiments, the processor 156 is capable of superscalar operation and pipelining instructions. The memory, one or more units, and one or more queues of the processor 156 may be configured to operate in parallel to process multiple instructions in a single processing cycle. The processor 156 may pipeline elements by processing instructions in stages, such that the pipelined stages may process a number of instructions concurrently. In addition, each queue may hold multiple threads of instructions. For example, there may be up to four (4) threads held within each queue. The processor and queues may be designed and configured to process more or less number of threads.

Figure 3A:
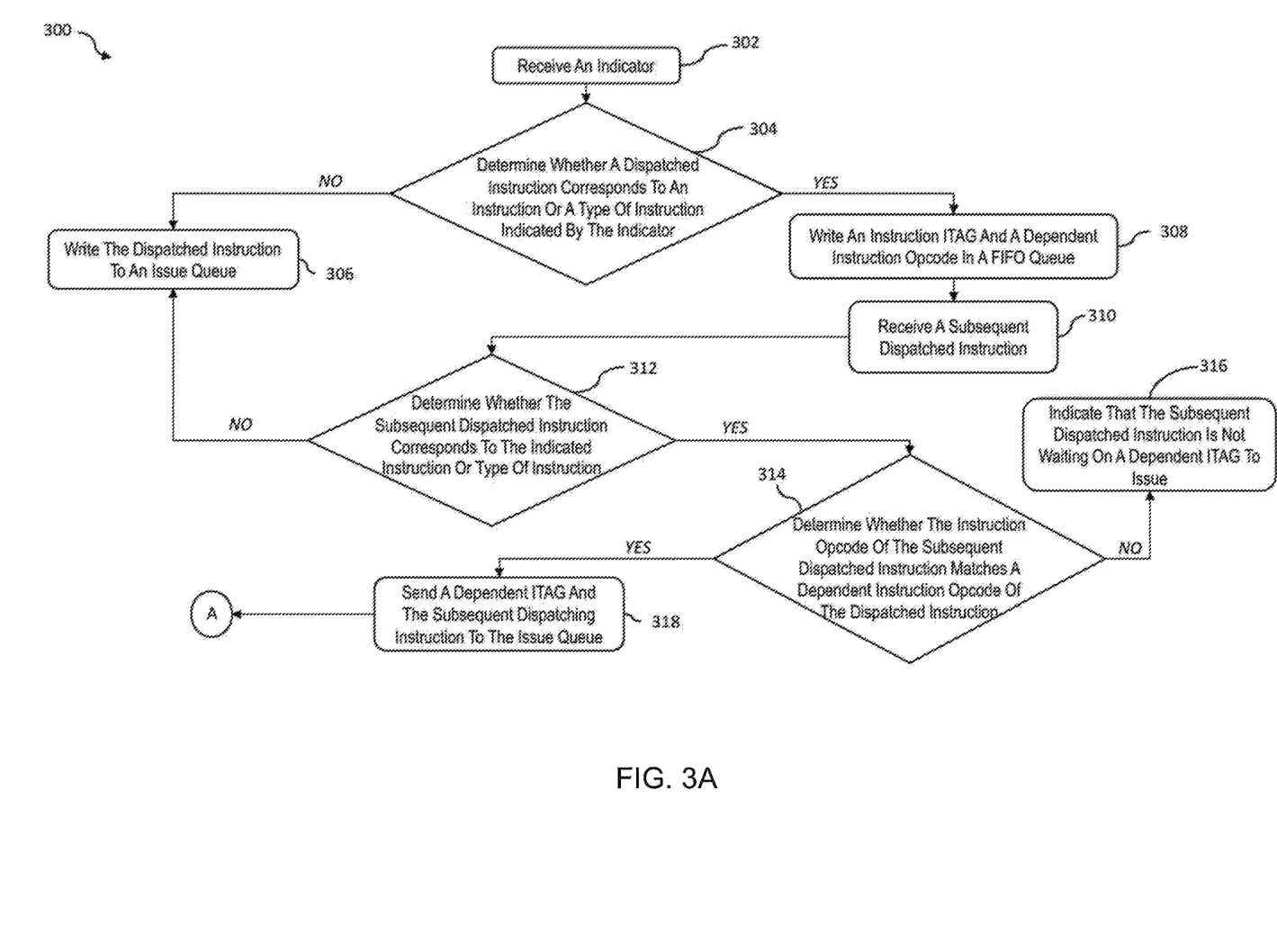
FIGS. 3A and 3B illustrate a flowchart of a method for artificially creating dependencies between instructions to process the instructions in-order, according to one or more embodiments of the present disclosure.
Figure 3B:
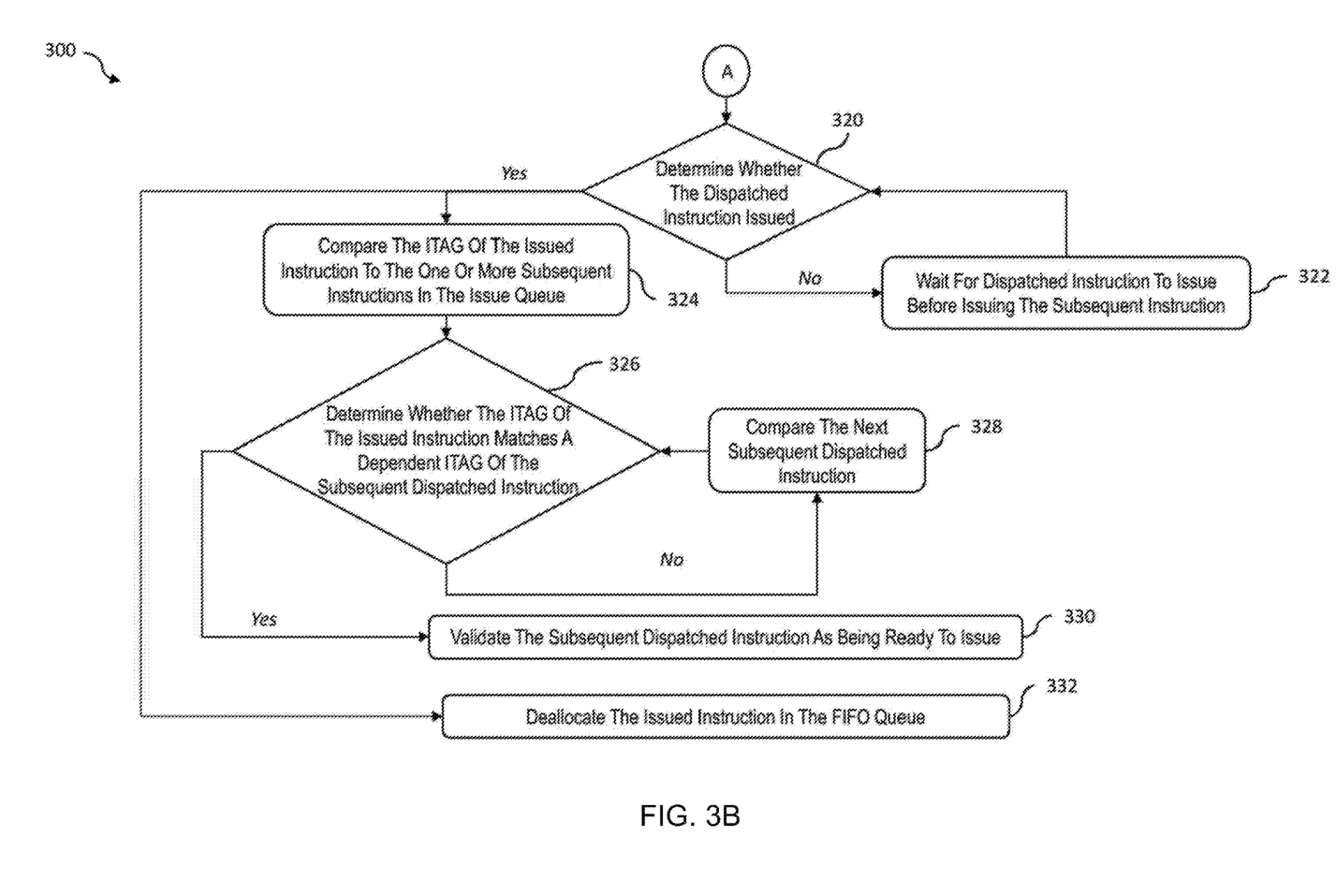

In one or more embodiments, the processor 156 is configured to operate in an out-of-order execution. In one or more embodiments, the processor 156 is configured to perform the functional blocks of the flowcharts of FIG. 3 described below that artificially create dependencies between instructions to operate in an in-order execution.

The processor 156 includes a cache memory 205 that may receive program instructions from one or more memory locations in or connected to computer 152. The cache memory 205 couples to a fetch unit 210 that the processor 156 employs to fetch multiple instructions from the cache memory 205. The instructions may be in the form of an instruction stream or thread that includes a series or sequence of instructions. The fetch unit 210 couples to a decode unit 215. The decode unit 215 may decode the instructions as resources of the processor 156 become available. The decode unit 213 may decode the instructions into one or more operations that represent the dataflow of the instruction stream of a thread. A thread may be a sequence of program instructions. In one or more embodiments, the fetch unit 210 and the decode unit 215 are configured to operate in an in-order execution fashion.

The decode unit 215 couples to a dispatch unit 220. The dispatch unit 220 couples to a queue configured to hold instructions dispatched from the dispatch unit 220. The dispatch unit 220 may accept the instructions from the decode unit 213 and typically dispatches the instructions to issue queue (IQ) 250. In one or more embodiments, the dispatch unit 220 issues instructions to the issue queue in order. In one or more embodiments, the dispatch unit 220 stamps and dispatches an instruction with an instruction tag and/or instruction identifier (iTAG). The iTAG may be assigned to the instruction in the order in which the dispatch unit 240 dispatched the instruction. The iTAG may also be assigned based on the thread.

In some embodiments, dispatch unit 220 may dispatch one or more instructions to the IQ 250 during a particular processor 156 clock cycle. For example, dispatch unit 220 may dispatch two (2) instructions at the same time, e.g. during the same processor cycle. IQ 250 includes an instruction data store (IDS) or queue that stores issue queue instructions. For example, the IQ 250 may store 24 instructions of processor 156 in the IDS or queue with 24 storage locations. In other embodiments, the queue may contain more or less entries. IQ 250 is coupled to and issues instructions to one or more execution units (EUs) 260.

The IQ 250 typically holds an instruction until data associated with the instruction has been retrieved and is ready for use. When data is not ready, e.g., not within the appropriate data cache or register file, delay can result as the IQ 250 will not issue the instruction to the execution unit. For at least this reason, the IQ 250 typically issues instructions to the EUs 260 out of order so instructions where the required data is available can be executed.

The one or more EUs 260 may include multiple execution units for execution of instructions from IQ 250 or instructions from other queues, such as, for example, store and/or load queues in execution units. The execution units may include load store units, vector scalar units, fixed point units, floating point units, and other execution units. The one or more EUs 260 may perform the operation specified by an instruction issued by the IQ 250.

In one or more embodiments, the dispatch unit 220 issues instructions to FIFO queue 240. FIFO queue 240 is configured to track the insertion order of the dispatched instructions and to evict the dispatched instruction entry that resides in FIFO queue 240 for the longest duration of time. That is, FIFO queue 240 processes the oldest entry first. FIFO queue 240 may employ a pointer directed at or pointing to the oldest dispatched instruction entry in FIFO queue 240. The pointer, e.g., eviction pointer, may be used to identify the eviction candidate. FIFO queue 240 may increment and/or adjust the pointer when a new entry is placed in FIFO queue 240.

In one or more embodiments, FIFO queue 240 is configured to store one or more types of instructions, for example, a branch instruction, a load instruction, or a fix point instruction, as a FIFO queue entry. A FIFO queue entry may include an iTAG of the instruction and a "dependent instruction type" field to indicate which instruction or which class of instruction to form a dependency chain. For example, by forming a dependency chain, IHS 10 and/or processor 156 may force branch instructions to execute in-order. By forcing branch instructions to execute in-order, IHS 10 and/or processor 156 can ensure that branch flushes occur in age order. In another example, by forming a dependency chain, IHS 10 and/or processor 156 may force a class of load instructions to execute in-order with respect to an older class of load instructions to ensure the correct behavior of cache memory 205. By forcing a class of load instructions to execute in-order, the processor 156 may also ensure that a speculative execution does not leave behind side channel information in the cache memory 205. In one or more embodiments, upon receiving instructions at dispatch, FIFO queue 240 populates a row in FIFO queue 240 that includes the instruction that needs to form a dependency with a younger instruction.

In one or more embodiments, FIFO queue 240 couples to IQ 250. In one or more embodiments, as the dispatched instruction enters FIFO queue 240, FIFO queue 240 determines whether the dispatched instruction is dependent on an older instruction. For cases in which the instruction is dependent on an older instruction type, then FIFO queue 240 reads out the ITAG of the older instruction and sends the dependent instruction to IQ 250. In one or more embodiments, the dependent instruction sent to IQ 250 waits to be issued by IQ 250 until the older instruction that the dependent instruction depends on issues. In one or more embodiments, when the dependent instruction issues, IQ 250 sends the iTAG to FIFO queue 240 to deallocate the corresponding instruction in FIFO queue 240.

FIGS. 3A and 3B illustrate a flowchart of method 300 for artificially creating dependencies between instructions to be processed in-order, according to one or more embodiments of the present disclosure. While the method 300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIGS. 3A and 3B, but the process may be integrated and/or one or more steps may be performed together, simultaneously, or the steps may be performed in the order disclosed or in an alternate order.

In one or more embodiments, as indicated in FIG. 3A, an indicator is received at 302, the indicator preferably being received by IHS 10 and/or processor. In one or more embodiments, the fetch unit 210 and/or decode unit 215 passes the indicator to the dispatch unit 220. In one or more embodiments, the indicator is an additional signal, such as a 'debug mark', which can be set by matching a particular instruction type. In some embodiments, the fetch unit 210 and/or decode unit 215 are set by firmware. The fetch unit 210 and/or decode unit 215 may be set after manufacture of the hardware. In one or more embodiments, if during initial testing of the hardware, an instruction type has an incorrect interaction with other instructions when executed out-of-order, the indicator can be set to match the instruction type that has the incorrect interaction. In one or more embodiments, an additional switch in the FIFO Queue 240 can be set to cause the FIFO Queue 240 to treat all instructions that have been 'debug marked' to be placed in the FIFO queue 240, and all subsequent instructions with the 'debug mark' set to be marked as dependent on the youngest 'debug mark' instruction in the FIFO queue.

In one or more embodiments, the indicator is included in the work-around logic that indicates an in-order issue of certain out-of-order instructions or a type of out-of-order instruction is necessary to slow down instruction streams. For example, the indicator may indicate that all branch instructions need to be issued in-order. Work around logic may be additional configurable hardware that is used to work around bugs found after the manufacture of the hardware. For example, registers may be put in place that match a certain instruction code. If a certain instruction type does not execute correctly after the manufacture of hardware, the instruction can be corrected by "trapping" and emulating the instruction in software. Additionally, the incorrect execution of the instruction can be corrected by slowing down the machine and executing a certain instruction type by itself rather than in parallel with other instructions.

In response to receiving the indicator, dispatch unit 220 is configured to dispatch one or more instructions to FIFO queue 240. In one or more embodiments, a determination is made at 304, preferably by FIFO queue 240, as to whether a dispatched instruction corresponds to the instruction or the type of instructions indicated by the indicator. For cases in which the dispatched instruction corresponds to the indicated instruction or type of instruction (304:YES), an instruction iTAG and a dependent instruction opcode is written at 308, preferably by FIFO queue 240, in FIFO queue 240. In one or more embodiments, the FIFO queue 240 sends the instruction iTAG to IQ 250. In one or more embodiments, when the dispatched instruction corresponds to the indicated instruction or type of instruction, dispatch unit 220 also sends the instruction to IQ 250. IQ 250 writes the iTAG of the dispatched instruction in IQ 250. For example, in an embodiment, the indicator indicates that branch type instructions need to be issued in-order. Dispatch unit 220 determines that the dispatched instruction is a branch instruction, for example, Branch Instruction 1, and sends the dispatched instruction to each of FIFO queue 240 and IQ 250. FIFO queue 240 writes the iTAG of Branch Instruction 1 in FIFO queue 240 and the corresponding dependent instruction opcode. In one or more embodiments, instead of or in addition to the dispatch unit 220 determining a dispatched instruction corresponds to the indicated instruction or type of instruction, the FIFO queue 240 determines that the dispatched instruction corresponds to the indicated instruction or the type of instruction. In one or more embodiments, the dependent instruction opcode indicates that a younger branch, for example, Branch Instruction 2, will be dependent on the older branch instruction, i.e., Branch Instruction 1. IQ 250 writes the iTAG of Branch Instruction 1 into IQ 250.

In one or more embodiments, the iTAG is an instruction number used to identify an instruction. With each new instruction, the instruction number of the iTAG may monotonically increase using a wrap-bit. An instruction opcode may be a code that indicates the type of instruction. For example, the instruction opcode can be a bit field indicating instruction class, such as b'1000' to indicate a load instruction, b'0100' to indicate a store instruction, b'0010' to indicate a branch instruction, b'0001' to indicate another type of instruction. In another example, the instruction opcode can include an instruction set with complex encoding, such as a PowerISA instruction set.

For cases in which the dispatched instruction does not correspond to the indicated instruction or type of instruction (304:NO), the dispatched instruction is written at 306, preferably by IQ 250, in IQ 250. For example, dispatch unit 220 determines that the dispatched instruction is a load instruction, for example, Load Instruction 1, and sends the dispatched instruction to IQ 250. IQ queue 250 is configured to write Load Instruction 1 in the IQ 250.

In one or more embodiments, one or more subsequent instructions are dispatched at 310, preferably by dispatch unit 220, to FIFO queue 240. In one or more embodiments, a determination is made at 312, preferably by FIFO queue 240, as to whether a subsequent dispatched instruction corresponds to the indicated instruction or type of instruction. For cases in which the subsequent dispatched instruction does not correspond to the indicated instruction or type of instruction (312:NO), the dispatched instruction is written at 306, preferably by IQ 250, in the IQ 250.

For cases in which the subsequent dispatched instruction corresponds to the indicated instruction or type of instruction (312:YES), a determination is made at 314, preferably by FIFO queue 240, as to whether the instruction opcode of the subsequent dispatched instruction matches the dependent instruction opcode of the dispatched instruction. For cases in which FIFO queue 240 determines that the instruction opcode of the subsequent dispatched instruction does not match the dependent instruction opcode (314:NO), an indication is made at 316 that the subsequent dispatched instruction is not waiting on a dependent iTAG to issue. In one or more embodiments, if the instruction opcode of the subsequent dispatched instruction does not match a dependent instruction opcode of the dispatched instruction, the FIFO queue 240 does not write the subsequent dispatched instruction in the FIFO queue 240. In one or more embodiments, the IQ 250 includes a 'ready' bit for each instruction stored in the IQ 250. When the subsequent dispatched instruction is written in the IQ 250, the IQ 250 sets the "ready" bit of the dependent ITAG for the subsequent dispatched instruction as valid, indicating that the subsequent dispatched instruction is not waiting on another instruction having a dependent iTAG to issue. That is, a valid "ready" bit indicates that the instruction is ready to issue. In some aspects, the "ready" bit may be set as "0" to be valid. In other aspects, the "ready" bit may be set as "1" to be valid.

For cases in which FIFO queue 240 determines that the instruction opcode of the subsequent dispatched instruction does match the dependent instruction opcode (314:YES), a dependent iTAG and the subsequent dispatching instruction is sent at 318, preferably by FIFO queue 240, to IQ 250. In some embodiments, the dependent iTAG is the iTAG of the related older branch. For example, Branch Instruction 1 includes iTAG 5, and Branch Instruction includes iTAG 10. In response to FIFO queue 240 determining that the instruction opcode of the Branch Instruction 2 matches the dependent instruction opcode of Branch Instruction 1, FIFO queue 240 generates a dependent iTAG, for example, dependent iTAG 5, for Branch Instruction 2. FIFO queue 240 sends dependent iTAG 5 and the iTAG of Branch Instruction 2 to IQ 250. IQ 250 writes the iTAG of Branch Instruction 2 and the dependent iTAG 5 into IQ 250. In another example in which the indicator indicates that load instructions are dependent on branch instructions, the instruction opcode of branch instruction b'0010' forces load instruction b'1000' to be compared with one or more instructions in the FIFO queue 240, and the iTAG of the branch instruction b'0010' is sent to the IQ 250 as a dependent iTAG of the load instruction b'1000' when the load instruction b'1000' is written in the IQ 250.

In one or more embodiments, as indicated in FIG. 3B, a determination is made at 320, preferably by IQ 250, as to whether the dispatched instruction issued. For the cases in which IQ 250 determines that the dispatched instruction did not issue (320:NO), the IQ 250 waits at 322 for the dispatched instruction to issue before issuing the subsequent instruction. For example, IQ 250 determines that Dispatch Instruction 1 has not issued. IQ 250 waits for Dispatch Instruction 1 to issue before issuing Dispatch Instruction 2. When one or more execution units 260 and the information necessary to execute Dispatch Instruction 1 are available, IQ 250 issues Dispatch Instruction 1, i.e., now referred to as Issued Instruction 1, to the one or more execution units 260 to be executed.

For cases in which IQ 250 determines that the dispatched instruction issued (320:YES), the iTAG of the issued instruction is compared at 324, preferably by IQ 250, to the one or more subsequent instructions in IQ 250. For example, IQ 250 sends the iTAG of the Issued Instruction 1 to one or more subsequent dispatched instructions, for example, Dispatch Instruction 2 and Dispatch Instruction 3 in IQ 250. In one or more embodiments, a determination is made at 326, preferably by IQ 250, as to whether the iTAG of the issued instruction matches a dependent iTAG of a subsequent dispatched instruction. For cases in which IQ 250 determines that the iTAG of the issued instruction does not match the dependent iTAG of the subsequent dispatched instruction (326:NO), the IQ 250 compares at 328 the next subsequent dispatched instruction to determine whether the iTAG of the issued instruction matches the dependent iTAG of the next subsequent dispatched instruction. For example, IQ 250 compares Issued Instruction 1 having iTAG 5 to Dispatch Instruction 4 having dependent iTAG 11, and determines that iTAG 5 does not match dependent iTAG 11. IQ 250 moves to the next subsequent dispatch instruction to determine whether the iTAG of the issued instruction matches the dependent iTAG of the next subsequent dispatch instruction, for example Dispatch Instruction 2.

For cases in which the IQ 250 determines that the iTAG of the issued instruction matches the dependent iTAG of a subsequent dispatch instruction (326:YES), the subsequent instruction is validated at 330, preferably by IQ 250, as being ready to issue. For example, the IQ 250 determines that the iTAG 5 of issued instruction 1 matches the dependent iTAG 5 of the subsequent dispatch instruction 2, the IQ 250 validates the dispatch instruction 2 as being ready to issue. For the cases in which an instruction is validated, the IQ 250 sets the "ready" bit. For example, the IQ 250 may set the "ready" bit as "0". In one or more embodiments, when one or more execution units 260 become available, IQ 250 sends the validated issue instruction to an available execution unit 260 to be executed.

For cases in which IQ 250 determines that the dispatched instruction issued (320:YES), the issued instruction is deallocated at 332, preferably by IQ 250, to FIFO queue 240. In one or more embodiments, IQ 250 sends the iTAG of the issued instruction to FIFO queue 240 to deallocate the corresponding issued instruction in FIFO queue 240. Having received the iTAG from the IQ 250, FIFO queue 240 determines which instruction corresponds to the iTAG and deallocates the corresponding issued instruction. The deallocated issued instruction is removed from FIFO queue 240 and the next oldest instruction no longer depends on the deallocated dispatched instruction issuing before the next oldest instruction can issue. For example, in response to the iTAG 5 of the Issued Instruction 1 being sent to FIFO queue 240, FIFO queue 240 locates the dispatched instruction in FIFO queue 240 corresponding to iTAG 5 and deallocates Issued Instruction 1 from FIFO queue 240.

In one or more embodiments, by artificially creating dependencies between instructions to process instructions in-order, instruction streams may be slowed thereby allowing, for instance, processor 156 to work around problems. In an example, when a user is running a browser, malicious/untrusted code may attempt to gain an understanding of the structure of a cache to determine what type and where information can be loaded in the cache. By not allowing malicious/untrusted code running in a browser to speculatively execute ahead of memory range checks, the malicious/untrusted code is prevented from loading information into the cache. That is, by slowing down instruction streams, processor 156 may prevent malicious/untrusted code from entering and/or harming one or more components of the IHS 10.

While the illustrative embodiments described above are preferably implemented in hardware, such as in units and circuitry of a processor, various aspects of the illustrative embodiments may be implemented in software as well. For example, it will be understood that each block of the flowchart illustrations in FIGS. 3A and 3B, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

In one or more embodiments, a method of processing information in a processor of a computer system includes receiving an indicator to issue an out-of-order instruction or a type of out-of-order instruction in-order. In one or more embodiments, the method includes receiving a first instruction. In one or more embodiments, the method includes determining whether the first instruction corresponds to the indicated out-of-order instruction or the type of out-of-order instruction. In one or more embodiments, the method includes writing, in response to determining that the first instruction corresponds to the indicated out-of-order instruction or the type of out-of-order instruction, an instruction identifier and a dependent instruction opcode into a first queue and an issue queue of the processor. In one or more embodiments, the method includes receiving at least one subsequent instruction. In one or more embodiments, the method includes determining whether an instruction opcode of the at least one subsequent instruction matches the dependent instruction opcode of the first instruction. In one or more embodiments, the method includes writing, in response to determining the instruction opcode of the subsequent instruction matches the dependent instruction opcode of the instruction, a dependent instruction identifier for the subsequent instruction into the issue queue.

In one or more embodiments, a computer program product includes a non-transitory computer-readable storage medium having program instructions embodied therewith, in which the program instructions are executable by one or more processors. The program instructions, in an embodiment, include receiving an indicator to issue an out-of-order instruction or a type of out-of-order instruction in-order. The program instructions, in an embodiment, include receiving a first instruction. The program instructions, in an embodiment, include determining whether the first instruction corresponds to the indicated out-of-order instruction or the type of out-of-order instruction. The program instructions, in an embodiment, include writing, in response to determining that the first instruction corresponds to the indicated out-oforder instruction or the type of out-of-order instruction, an instruction identifier and a dependent instruction opcode into a first queue and an issue queue of the processor. The program instructions, in an embodiment, include receiving at least one subsequent instruction. The program instructions, in an embodiment, include determining whether an instruction opcode of the at least one subsequent instruction matches the dependent instruction opcode of the first instruction. The program instructions, in an embodiment, include writing, in response to determining the instruction opcode of the subsequent instruction matches the dependent instruction opcode of the instruction, a dependent instruction identifier for the subsequent instruction into the issue queue.

In one or more embodiments, an information handling system includes memory having program instructions embodied therewith, and at least one processor. In an embodiment the at least one processor is configured to read the program instructions to execute a dispatch unit configured to receive an indicator to issue an out-of-order instruction or a type of out-of-order instruction in-order. In an embodiment the at least one processor is configured to read the program instructions to execute a first queue configured to: receive a first instruction, determine whether the first instruction corresponds to the indicated out-of-order instruction or the type of out-of-order instruction, write, in response to determining that the first instruction corresponds to the indicated out-of-order instruction or the type of out-of-order instruction, an instruction identifier and a dependent instruction opcode into the first queue and an issue queue of the processor, receive at least one subsequent instruction, and determine whether an instruction opcode of the at least one subsequent instructions matches the dependent instruction opcode of the first instruction. In an embodiment the at least one processor is configured to read the program instructions to execute the issue queue configured to write, in response to determining the instruction opcode of the subsequent instruction matches the dependent instruction opcode of the instruction, a dependent instruction identifier for the subsequent instruction into the issue queue.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing information in a processor of a computer system, the method comprising:
   receiving a first instruction;
   determining whether the first instruction has an indicator to issue an out-of-order instruction or type of out-of-order instruction in order;
   sending by a dispatch unit, in response to determining that the first instruction has the indicated out-of-order instruction or the type of out-of-order instruction, the first instruction to both a first queue and an issue queue of the processor, wherein the issue queue is configured to hold and issue instructions to one or more execution units and the first queue is configured to hold and issue instructions to the issue queue and is further configured to operate differently than the issue queue;
   writing, in response to determining that the first instruction corresponds to the indicated out-of-order instruction or the type of out-of-order instruction, an instruction identifier and a dependent instruction opcode into the first queue and the issue queue of the processor;
   receiving at least one subsequent instruction;
   determining whether an instruction opcode of the at least one subsequent instruction matches the dependent instruction opcode of the first instruction; and
   writing, in response to determining the instruction opcode of the subsequent instruction matches the dependent instruction opcode of the instruction, a dependent instruction identifier for the subsequent instruction into the issue queue.

2. The method of claim 1, further comprising determining whether the first instruction issued from the issue queue to the one or more execution units.

3. The method of claim 2, further comprising waiting, in response to determining that the first instruction did not issue to the one or more execution units, to issue the at least one subsequent instruction to the one or more execution units.

4. The method of claim 2, further comprising comparing, in response to determining that the first instruction issued to the one or more execution units, the information identifier of the first instruction to the dependent instruction identifier of the at least one subsequent instruction.

5. The method of claim 4, further comprising:
determining that the information identifier of the first instruction matches the dependent instruction identifier of the at least one subsequent instruction; and
preparing the at least one subsequent instruction to issue to the one or more execution units.

6. The method of claim 2, further comprising deallocating, in response to determining that the first instruction issued to the one or more execution units, the first instruction from the first queue of the processor.

7. The method of claim 1, wherein the first queue of the processor is a first in, first out (FIFO) queue.

8. The method of claim 1, further comprising sending, in response to determining that the first instruction does not correspond to the indicated out-of-order instruction or the type of out-of-order instruction, the first instruction to the issue queue of the processor but not the first queue and writing the first instruction in the issue queue.

9. A computer program product comprising:
a non-transitory computer-readable storage medium having program instructions embodied therewith, the program instructions executable by one or more processors, the program instructions when executed by the processor cause the processor to:
determine whether a first instruction has an indicator to issue an out-of-order instruction or a type of out-of-order instruction in order;
send by a dispatch unit, in response to determining that the first instruction corresponds to the indicated out-of-order instruction or the type of out-of-order instruction, the first instruction to both a first queue and an issue queue of the processor, wherein the issue queue is configured to hold and issue instructions to one or more execution units and the first queue is configured to hold and issue instructions to the issue queue and is further configured to operate differently than the issue queue;
write, in response to determining that the first instruction corresponds to the indicated out-of-order instruction or the type of out-of-order instruction, an instruction identifier and a dependent instruction opcode into the first queue and the issue queue of the processor;
receive at least one subsequent instruction;
determine whether an instruction opcode of the at least one subsequent instruction matches the dependent instruction opcode of the first instruction; and
write, in response to determining the instruction opcode of the subsequent instruction matches the dependent instruction opcode of the instruction, a dependent instruction identifier for the subsequent instruction into the issue queue.

10. The computer program product of claim 9, further comprising program instructions to determine whether the first instruction issued from the issue queue to the one or more execution units.

11. The computer program product of claim 10, further comprising program instructions to wait, in response to determining that the first instruction did not issue to the one or more execution units, to issue the at least one subsequent instruction to the one or more execution units.

12. The computer program product of claim 10, further comprising program instructions to compare, in response to determining that the first instruction issued to the one or more execution units, the information identifier of the first instruction to the dependent instruction identifier of the at least one subsequent instruction.

13. The computer program product of claim 9, further comprising program instructions to:
determine that the information identifier of the first instruction matches the dependent instruction identifier of the at least one subsequent instruction; and
prepare the at least one subsequent instruction to issue to the one or more execution units.

14. The computer program product of claim 10, further comprising program instructions to deallocate, in response to determining that the first instruction issued to the one or more execution units, the first instruction from the first queue of the processor.

15. The computer program product of claim 9, further comprising program instructions to send, in response to determining that the first instruction does not correspond to the indicated out-of-order instruction or the type of out-of-order instruction, the first instruction to the issue queue of the processor and not to the first queue of the processor.

16. An information handling system comprising:
memory having program instructions embodied therewith, and
at least one processor configured to read and execute the program instructions;
a dispatch unit configured to receive an indicator to issue an out-of-order instruction or a type of out-of-order instruction in-order and send, in response to determining that a first instruction corresponds to the out-of-order instruction or the type of out-of-order instruction, the first instruction to both a first queue and an issue queue of the processor;
the first queue configured to:
operate differently than the issue queue,
receive a first instruction,
determine whether the first instruction corresponds to the indicated out-of-order instruction or the type of out-of-order instruction,
write, in response to determining that the first instruction corresponds to the indicated out-of-order instruction or the type of out-of-order instruction, an instruction identifier and a dependent instruction opcode into the first queue and the issue queue of the processor,
receive at least one subsequent instruction,
determine whether an instruction opcode of the at least one subsequent instruction matches the dependent instruction opcode of the first instruction, and
hold and issue instructions to the issue queue; and
the issue queue configured to:
write, in response to determining the instruction opcode of the subsequent instruction matches the dependent instruction opcode of the instruction, a dependent instruction identifier for the subsequent instruction into the issue queue, and
hold and issue instructions to one or more execution units.

17. The information handling system of claim 16, wherein the issue queue is further configured to determine whether the first instruction issued from the issue queue to the one or more execution units.

18. The information handling system of claim 17, wherein the issue queue is further configured to compare, in response to determining that the first instruction issued to the one or more execution units, the information identifier of the first instruction to the dependent instruction identifier of the at least one subsequent instruction.

19. The information handling system of claim 18, wherein the issue queue is further configured to:
   determine that the information identifier of the first instruction matches the dependent instruction identifier of the at least one subsequent instruction; and
   prepare the at least one subsequent instruction to issue to the one or more execution units.

20. The information handling system of claim 17, wherein the issue queue is further configured to deallocate, in response to determining that the first instruction issued to the one or more execution units, the first instruction from the first queue of the processor.

* * * * *